United States Patent
Hauzenberger et al.

(10) Patent No.: US 12,209,293 B2
(45) Date of Patent: Jan. 28, 2025

(54) PROCESS AND APPARATUS FOR DIRECT REDUCTION WITH ELECTRICALLY HEATED-UP REDUCTION GAS

(71) Applicant: Primetals Technologies Austria GmbH, Linz (AT)

(72) Inventors: Franz Hauzenberger, Linz (AT); Robert Millner, Loosdorf (AT); Hanspeter Ofner, Pucking (AT); Norbert Rein, Vienna (AT); Gerald Rosenfellner, Ertl (AT); Johann Wurm, Bad Zell (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 773 days.

(21) Appl. No.: 17/414,368

(22) PCT Filed: Dec. 16, 2019

(86) PCT No.: PCT/EP2019/085350
§ 371 (c)(1),
(2) Date: Jun. 16, 2021

(87) PCT Pub. No.: WO2020/127049
PCT Pub. Date: Jun. 25, 2020

(65) Prior Publication Data
US 2022/0074006 A1  Mar. 10, 2022

(30) Foreign Application Priority Data
Dec. 17, 2018 (EP) .................................... 18213141

(51) Int. Cl.
*C21B 13/00* (2006.01)
*C21B 13/12* (2006.01)

(52) U.S. Cl.
CPC ...... *C21B 13/0046* (2013.01); *C21B 13/0073* (2013.01); *C21B 13/12* (2013.01); *C21B 2100/22* (2017.05)

(58) Field of Classification Search
CPC . C21B 13/0046; C21B 13/0073; C21B 13/12; C21B 2100/22; C21B 13/004; Y02P 10/134; Y02P 10/143
(Continued)

(56) References Cited

U.S. PATENT DOCUMENTS 4,425,659 A  1/1984  Stenkvist
6,478,841 B1  11/2002  Faccone ...................... 75/10.63
(Continued)

FOREIGN PATENT DOCUMENTS

BE  1016305 A6  7/2006
CN  207567268 U  * 7/2018  ............. C21B 13/02
(Continued)

OTHER PUBLICATIONS

CN207567268 U Translation (Year: 2018).*
(Continued)

*Primary Examiner* — Brian D Walck
*Assistant Examiner* — Danielle Carda
(74) *Attorney, Agent, or Firm* — OSTROLENK FABER LLP

(57) ABSTRACT

A method of direct reduction of metal oxides that includes catalytic reforming of hydrocarbonaceous gas in a reformer to obtain reformer gas, obtaining at least one precursor gas based on the reformer gas, preparing a reduction gas by heating the at least one precursor gas by means of electrical energy, at least a portion of the electrical energy being introduced by means of plasma.

10 Claims, 10 Drawing Sheets

(58) Field of Classification Search
USPC .......................................................... 75/503
See application file for complete search history.

(56) References Cited

U.S. PATENT DOCUMENTS

| | | | |
|---|---|---|---|
| 6,524,356 B2 | 2/2003 | Fournier | |
| 6,986,800 B2 | 1/2006 | Duarte-Escareno | |
| 2004/0226406 A1 | 11/2004 | Duarte-Escareno et al. | ... 75/452 |
| 2007/0084116 A1* | 4/2007 | Ringler | ............ B01J 8/0221 |
| | | | 48/127.9 |
| 2015/0329931 A1 | 11/2015 | Eder | |

FOREIGN PATENT DOCUMENTS

| | | |
|---|---|---|
| DE | 102016122083 A1 | 5/2018 |
| EP | 1937589 A1 | 7/2008 |
| EP | 2895629 A1 | 7/2015 |
| EP | 3541964 A1 | 9/2019 |
| GB | 1460852 A | 1/1977 |
| RU | 2195425 C2 | 12/2002 |
| WO | WO 99/11571 A1 | 3/1999 |
| WO | WO 2005/080609 A1 | 9/2005 |
| WO | WO 2007/042279 A1 | 4/2007 |
| WO | WO 2014/040997 A1 | 3/2014 |
| WO | WO 2018/091028 A1 | 5/2018 |

OTHER PUBLICATIONS

Indian First Examination Report, dated Feb. 24, 2022, issued in corresponding Indian Patent Application No. 202117023065.
International Search Report mailed Mar. 6, 2020 in corresponding PCT International Application No. PCT/EP2019/085350.
Written Opinion mailed Mar. 6, 2020 in corresponding PCT International Application No. PCT/EP2019/085350.
European Search Report mailed May 9, 2019 in corresponding European Patent Application No. 18213141.7.
Russian Decision to Grant, dated Feb. 28, 2022, issued in corresponding Russian Patent Application No. 2021120201/05(042366). English Translation.
Kurunov, I.F. et al. State and prospects of blast-furnace iron metallurgy., M.: Chermetinformatsia, (2002) pp. 117-128 English Translation.
Examination Report dated Oct. 9, 2023 issued in corresponding Indian Patent Application No. 202117023065 with English translation.

* cited by examiner

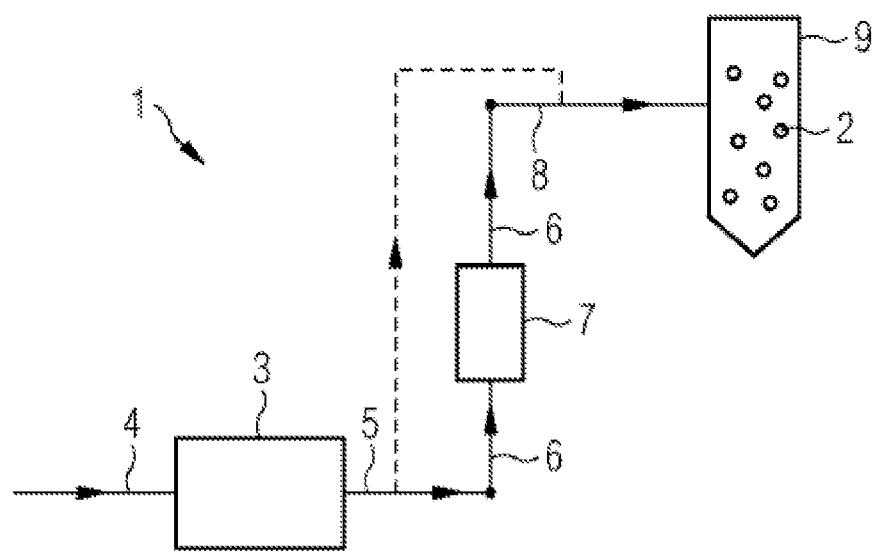

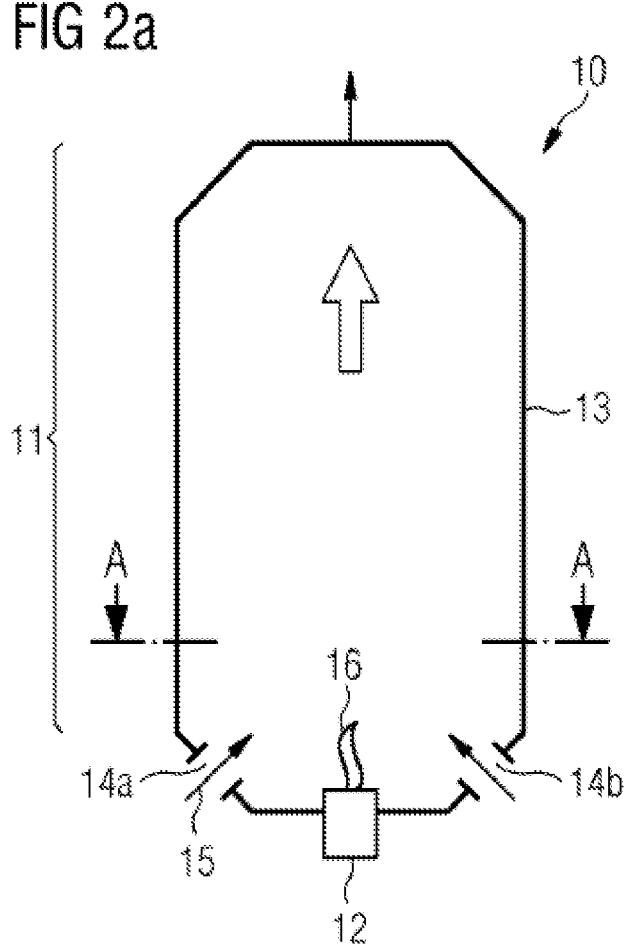
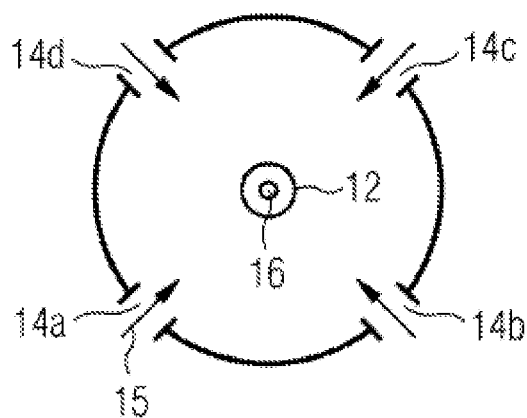

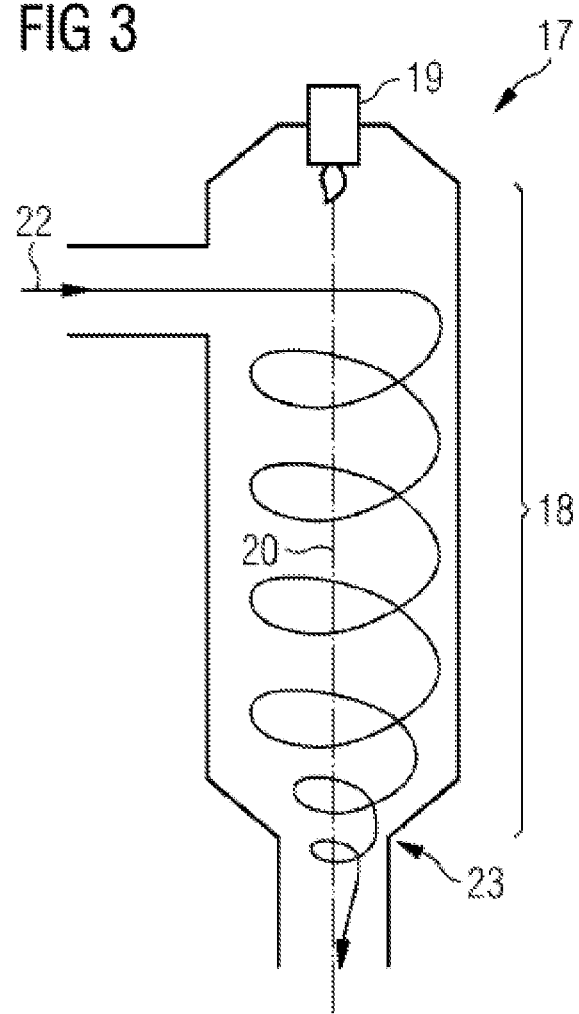

PROCESS AND APPARATUS FOR DIRECT REDUCTION WITH ELECTRICALLY HEATED-UP REDUCTION GAS

CROSS-REFERENCE TO RELATED APPLICATIONS

The present application is a 35 U.S.C. §§ 371 national phase conversion of PCT/EP2019/085350, filed Dec. 16, 2019, the contents of which are incorporated herein by reference, which claims priority of European Patent Application No. 18213141.7, filed Dec. 17, 2018, the contents of which are incorporated by reference herein. The PCT International Application was published in the German language.

FIELD OF INDUSTRY

The invention relates to a method of direct reduction of metal oxides using a reduction gas based on at least one precursor gas, wherein at least one precursor gas is based on reformer gas obtained by catalytic reforming of hydrocarbonaceous gas in a reformer. It also relates to an apparatus for direct reduction of metal oxides by means of a reduction gas, comprising a catalytic reformer for production of a reformer gas, a reformer gas conduit for discharge of reformer gas from the catalytic reformer, a reduction unit, and a reduction gas conduit for introduction of reduction gas into the reduction unit.

STATE OF THE ART

Production of metals by means of direct reduction of metal oxides by a reduction gas produced by means of reforming of hydrocarbonaceous gases is known—for example, the MIDREX® process for direct reduction of iron oxides is economically very important. For the purpose of direct reduction, the reduction gas is introduced into a reduction shaft filled with the metal oxide, and reacts with the filling as it flows through. The reaction kinetics for the reduction are more favorable at higher reduction gas temperature—in order to achieve a desired plant output at a comparatively lower inlet temperature of the reduction gas, for a given reduction shaft, it would be necessary to increase the specific reduction gas rate and possibly the plant pressure, or to use more readily reducible raw materials—for example pellets—that are associated with significantly higher costs. However, there are limits to the maximum plant pressure that can be established and the maximum specific reduction gas rate that can be introduced, since the pressure drop otherwise becomes too great and leads to hindrance of material flow. Establishment of a desired inlet temperature must proceed from the temperature level of the gas leaving the reformer. However, any increase in this temperature level is subject to temperature limits in the reformer.

In order to be able to raise production output in spite of such constraints associated with the reduction shaft and the reformer, measures for increasing the inlet temperature are often implemented between reformer and reduction shaft. For example, it is known that oxygen can be introduced into the gas stream in order to induce temperature-increasing combustion of reducing constituents. However, this has the disadvantage that the reduction power of the reduction gas introduced decreases, and the specific energy consumption of the direct reduction is increased overall. Although increasing the temperature by combustion of additional natural gas with oxygen leads to a simultaneous increase in the reduction gas rate, this can cause problems through a change in the reduction gas composition, soot formation and unfavorable gas flows, and has to be carefully controlled.

SUMMARY OF THE INVENTION

Technical Problem

A method and an apparatus that allow an increase in the inlet temperature and increase in the production output without the disadvantages of known methods are to be presented.

Technical Solution

This object is achieved by a method of direct reduction of metal oxides using a reduction gas based on at least one precursor gas, wherein at least one precursor gas is based on reformer gas obtained by catalytic reforming of hydrocarbonaceous gas in a reformer, characterized in that preparation of the reduction gas involves heating at least one precursor gas based on reformer gas, and optionally additionally also one or more further precursor gases, by means of electrical energy.

Reduction gas is a gas which is introduced into a reduction unit containing metal oxides to be reduced—for example a reduction shaft or a fluidized bed unit—in order to at least partly reduce the metal oxides therein.

A reduction gas based at least partly on a precursor gas, wherein at least one precursor gas is based on reformer gas obtained by catalytic reforming of hydrocarbonaceous gas in a reformer and is heated up by means of electrical energy in the preparation of the reduction gas, is called reduction gas A for example. For direct reduction, it is possible either to use reduction gas A only, or it is also possible to use a further reduction gas or multiple further reduction gases—also called additional reduction gases—in addition to reduction gas A; in this case, the conditions mentioned for the reduction gas A need not apply to the further reduction gases.

Catalytic reforming refers to the reaction of hydrocarbonaceous substances, especially gases, with $H_2O$ and $CO_2$ in the presence of a catalyst in a catalytic reformer for production of $H_2$- and CO-containing gas, which is called reformer gas in the context of this application.

Reformer gas generally emerges from the reformer with an exit temperature in the range from 850° C. to 970° C.

The metal oxides preferably comprise iron oxides; more preferably, they are iron oxides. Iron oxides are, for example, hematite ores or magnetite ores, or agglomerates, for example iron ore pellets.

Reduction is effected using a reduction gas based on at least one precursor gas—at least one precursor gas is thus used in the preparation of the reduction gas. At least one precursor gas is based on the reformer gas; it is also possible for two or more precursor gases to be based on the reformer gas. In the preparation of this reduction gas, at least one precursor gas is heated up by means of electrical energy. According to the invention, at least one precursor gas based on reformer gas is heated up by means of electrical energy.

A further precursor gas may, for example, be
 an unreformed portion of a hydrocarbonaceous gas intended for reforming,
 hydrogen $H_2$,
 carbon monoxide CO,
 hydrocarbonaceous gases, for example based on LPG, PAH, BTEX, $CH_4$, CmHn, natural gas, and/or a mixture of these gases, a top gas drawn off from a reduction unit in which the metal oxides are reduced, or top gas drawn off from the reduction unit in which the metal oxides are directly reduced in the performance of the method of the invention, inert gases, for example $N_2$, Ar, or a mixture of two or more of these gases cited by way of example, or a mixture of another gas with one or more of these gases cited by way of example. At least one further precursor gas contains gas components that are reducing with respect to metal oxides, preferably iron oxides, or consists of such gas components. Further precursor gas may alternatively comprise gas components that are inert with respect to metal oxides, or carburizing gas components, or consist of such gas components.

The reformer gas is the product obtained in catalytic reforming of hydrocarbonaceous gas—for example natural gas, methane, liquefied natural gas LNG, liquefied petroleum gas LPG, coking furnace gas COG, biogas; it may be a pure gas or a gas mixture—in a reformer. Precursor gas based on the reformer gas may comprise at least a portion of the reformer gas; it may also comprise the entire reformer gas. Precursor gas based on the reformer gas may also consist of a portion of the reformer gas or the entire reformer gas. Precursor gas based on the reformer gas can also be produced by altering the reformer gas, for example by variation of pressure, temperature or composition. The composition can be altered, for example, by supplying other gases—for example natural gas—by removing gas components, or by reactions in the reformer gas—such reactions may be caused, for example, by changing pressure or temperature, or by supply of other gases.

Advantageous Effects of the Invention

According to the invention, in the preparation of the reduction gas, at least one precursor gas based on reformer gas is heated up by means of electrical energy.

This has the advantage that no oxygen or combustion products are introduced for the increase in temperature, and associated problems with regard to oxidation of reducing gas components or alteration of the gas composition are avoided. Compared to oxygen-based processes for increasing the temperature, it is possible to distinctly increase the output of a direct reduction plant since no reducing gas components are consumed for the increase in temperature. The lower the temperature of the precursor gas, the more marked the benefit of electrical heating: in the case of a greater differential from an ultimate target temperature, given a lower precursor gas temperature, it is necessary to burn more gas in order to correspondingly increase the temperature by the combustion—in other words, more reducing gas components in the precursor gas would thus be oxidized, which reduces the reduction potential for metal oxides.

Safety is also increased because no explosive mixtures with oxygen can form.

Electrical heating can also have the effect that chemical reactions proceed more quickly and new gas equilibria are established. It is also possible to form plasma or free radicals that are particularly reactive; it may be the case here that the composition of a plasma carrier gas is also altered by chemical reactions and/or molecular dissociation.

In addition, it is optionally also possible to heat up a further precursor gas or multiple further precursor gases by means of electrical energy.

The electrical energy preferably heats the precursor gas based on reformer gas up to a temperature within a range of up to 200° C., preferably up to 100° C., more preferably up to 70° C., above its exit temperature from the reformer. For example, precursor gas based on reformer gas that exits from the reformer with an exit temperature of 900° C. is heated to 970° C. by the electrical energy.

The greater the increase in temperature to be caused by heating by means of electrical energy, the less economic this heating is by comparison with an excess increase in temperature in the reformer; therefore, an upper limit of 200° C., preferably up to 100° C., more preferably up to 70° C., in the temperature increase is envisaged for the heating.

The one further precursor gas or the multiple further precursor gases that are heated by electrical energy are preferably heated here to a temperature within a range of up to 200° C. above the exit temperature of reformer gas from the reformer.

From the exit from the reformer up to the introduction into a reduction unit containing the metal oxides to be reduced, heat can be lost to the environment. Feeding-in of other gases—for example additional gas or further precursor gas—with a lower temperature compared to reformer gas, which is optionally effected for production of the reduction gas, leads to a lower temperature of the reduction gas. Heating by means of electrical energy can at least partially compensate for any loss of heat to the environment or lowering of temperature owing to feeding-in, and the reduction gas can be given the desired temperature for entry into the reduction unit containing the metal oxides to be reduced.

For the reduction gas at least not to be significantly cooler than the exit temperature from the reformer on introduction, preference is given to an increase in temperature by at least 10° C., more preferably at least 20° C., even more preferably at least 30° C., and extremely preferably at least 50° C., above the exit temperature.

Preferably, the one further precursor gas or the multiple further precursor gases that are heated up by electrical energy are heated here to a temperature within a range of at least 10° C., more preferably at least 20° C., even more preferably at least 30° C., and extremely preferably at least 50° C., above the exit temperature.

In the case of electrical heating of precursor gas based on the reformer gas after reforming, or in the case of electrical heating of another precursor gas, reformer operation can be optimized without any lower temperature of the reformer gas associated therewith having any adverse effect on the productivity of the direct reduction. Changes in the temperature and also in the composition of the reduction gas that are favorable for improved productivity of the direct reduction can be performed after the reforming. It is thus not necessary to operate the reformer outside the temperatures that are optimal for its function and favorable service lives, in order to ensure a desired reduction gas temperature or composition. Instead, the reformer can be operated under benign conditions, which extends its lifetime, specifically of the reformer tubes, on account of lower creep in longitudinal and diameter direction of the reformer tubes, or prolongs the lifetime of the catalyst in the reformer. This increases the economic viability of the method of direct reduction. A reduced temperature level in the reformer also leads to a reduced temperature of the reformer offgas and reduced fuel demand; the associated low energy loss of the method increases economic viability.

Benign operation of a catalytic reformer at a reduced temperature level can lead to a composition of the reformer gas that does not promote optimal direct reduction, specifically with regard to $CH_4$ slip and $CO_2$ content in the reformer gas. Heating by means of electrical energy can compensate, for example, for the reduced reduction performance on account of $CH_4$ slip and associated higher $CH_4$ content in the reduction gas. Electrical heating for such a reformer gas has the advantage that the reduction potential is not also reduced by conversion of reducing gas components for the purpose of heating.

It is likewise possible to partly compensate for aging-related degradation or deactivation of the catalyst in the reformer by the electrical heating, and hence to delay the need for complex and costly exchange of the catalyst material.

In addition, it is possible by means of electrical heating to heat to temperatures that would not be achievable in the case of heating in the reformer.

It is also advantageous that it is possible through the decoupling of the temperature of the reduction gas from the temperature of the reformer gas—and hence indirectly possibly also decoupling of the composition of the reduction gas from the composition of the reformer gas—to easily and quickly establish the best temperature for the metal oxides present in each case and the current amount of coating. The control range of electrical heating is greater, and the control is quicker compared to an influence in the reformer. The operation of the reforming and the operation of the direct reduction can thus be independently optimized, which makes the method more economic overall. Compared to heating by means of combustion with partial oxidation, electrical heating is more quickly and accurately controllable since it is not necessary to take account of combustion reactions. Compared to heating by means of indirect heating via heat exchangers, electrical heating is more quickly and accurately controllable.

Especially in the case of startup of a direct reduction plant for performance of the method of the invention, the electrical heating of the invention is favorable. It opens up the option of promoting in situ reforming before and/or after contact with the metal oxides in a reduction gas based solely or on a reformer gas wherein few constituents have been reformed—because the reformer is not yet operating fully on startup—by a rapidly controllable increase in temperature.

In one variant, at least a portion of the electrical energy is introduced directly into the precursor gas to be heated by means of electrical energy, for example by means of resistance heating with heating coils, or an arc between electrodes. Direct introduction has the advantage that efficiency is very high. This also has the advantage that nothing is physically added in the introduction of the energy. It is possible to influence the physical composition of the reduction gas since the energy input affects the kinetics of chemical reactions of components present in the precursor gas, or, for example, conversions of components present in the precursor gas proceed at electrode surfaces.

In one variant, at least a portion of the electrical energy is introduced into the precursor gas by means of a carrier medium, preferably by means of plasma. It is possible here to influence the physical composition of the reduction gas via appropriate composition of the carrier medium. The carrier medium may be a gas and/or liquid—for example mineral oil—and/or a solid. The carrier medium is preferably free of molecular oxygen.

In the case of a plasma which is operated with a carrier gas, it is a preferred variant that at least a portion of the carrier gas is a member of the following group of constituents:

a reformer gas obtained by catalytic reforming of hydrocarbonaceous gas in a reformer,
an unreformed portion of a hydrocarbonaceous gas provided for the reforming,
hydrogen $H_2$,
carbon monoxide CO,
hydrocarbonaceous gases, for example based on LPG, PAH, BTEX, $CH_4$, CmHn, natural gas, and/or a mixture of these gases,
a top gas drawn off from a reduction unit in which the metal oxides are reduced, or top gas drawn off from the reduction unit in which the metal oxides are directly reduced in the performance of the method of the invention,
inert gases, for example $N_2$, Ar.

This is because the carrier gas will at least partly dissociate as a result of the high temperatures in the plasma burner and will normally partly recombine again on mixing with the precursor gas. Suitable choice of carrier gas can give rise to additional reducing gas components such as CO or $H_2$. Some plasma components—for example atomic hydrogen H—also react very rapidly with metal oxide, preferably iron oxide. Particular preference is given to carrier gases that, after mixing, produce additional reducing compounds after recombination, or react very rapidly in the plasma state with the metal oxide, preferably iron oxide.

In principle, a carrier gas may be a process gas—including natural gas—or may be an offgas from a method of direct reduction or from the method of the invention for direct reduction—for example top gas from the reduction unit, i.e., for example, a reduction shaft or a fluidized bed unit—or it may be a gas from an external gas source—for example a coking furnace gas COG, biogas, LNG, gas based on LPG, where these gases may be used in cooled or preheated and in purified or unpurified form. Useful gases include $H_2$- and/or CO- and/or $CO_2$- and/or $H_2O$-containing and/or $CH_4$-containing gases and/or other hydrocarbonaceous gases, cooled or preheated gases, purified or unpurified gases.

The choice of carrier medium can influence the composition of the reduction gas since the carrier medium itself can also supply components to the reduction gas. For example, a purified top gas may be utilized as carrier medium alone or in a mixture with other carrier media, for example coking furnace gas COG. Temperatures in a plasma are generally very high. If compounds whose thermal breakdown is desirable are part of the carrier medium, it is firstly possible to benefit from their thermal breakdown. It is secondly possible to utilize breakdown products as reducing gas components, or as precursors for reducing gas components, of the reduction gas. It is also particularly advantageous not to supply the reformer with compounds that are difficult to reform in a reformer, but to utilize them as a constituent of the carrier medium in order to find a use for breakdown products as reducing gas components, or as precursors for reducing gas components of the reduction gas. It may be the case, for example, that natural gas includes higher hydrocarbons that have to be separated off before reforming in a reformer. Such components that have been separated off can then be utilized as carrier media or portions thereof.

It is preferable to use gases or gas mixtures, the use of which prevents soot formation, as carrier gas. For this purpose, the ratio of carbonaceous or hydrocarbonaceous gas constituents to oxidizing gas constituents, for example $CO_2$, $H_2O$, and the electrical power and the size of the carrier media streams or gas streams, is controlled accordingly.

The high demand for electrical energy for operating plasma burners would suggest that use of plasma burners for electrical heating of precursor gas is economically unacceptable. It has now been found that, unexpectedly, even in the case of electrical heating by means of plasma in the process regime of direct reduction, it is possible to achieve economically favorable results in the higher temperature range.

In one variant, precursor gas envisaged for electrical heating, prior to the heating by means of electrical energy, is already heated in another way, preferably to at least 700° C., more preferably to at least 750° C. In the case of reformer gas as precursor gas, the electrical heating is thus disposed downstream of the reformer and downstream of another non-electrical heating method in flow direction of the reformer gas, in order, for example, to bypass the temperature limitation of this other heating method or to increase the lifetime/economic viability of this other heating method.

In one variant, precursor gas envisaged for electrical heating is heated up by means of electrical energy to more than 800° C., preferably to more than 900° C. In the case of iron oxides, the reduction reactions proceed with economically satisfactory efficiency at such temperatures of the reduction gas. Moreover, it is thus also possible to economically use inexpensive iron oxides with low reduction capacity/low reducibility because the increase in performance through increasing temperature is actually distinctly higher for substances having low reducibility.

The reduction gas is introduced into a reduction unit containing the metal oxides to be reduced—or into the metal oxides in the reduction unit. In the case of a reduction shaft, the introduction is, for example, into a material bed containing the metal oxides in the reduction shaft, and in the case of a fluidized bed unit into a fluidized bed containing the metal oxides in the fluidized bed unit.

In one variant, the temperature of the reduction gas on introduction into a reduction unit containing the metal oxides to be reduced is at least above 800° C., preferably at least above 900° C., more preferably at least 940° C., and up to 1100° C., preferably up to 1050° C., more preferably up to 1000° C. With iron oxides, the reduction reactions then proceed with economically satisfactory efficiency within a temperature range. In principle, the temperature in the reduction unit—i.e., for example, a reduction shaft or a fluidized bed unit—should be at a maximum for the direct reduction, but the usable range is limited at the upper end by the agglomeration characteristics—sticking, clustering—of the metal oxides, for example iron oxides. Moreover, higher temperature in the case of a corresponding composition of the reduction gas can contribute to in situ reformation of gas components in the reduction unit. This results in an increase in the reduction gas rate combined with an increase in the reductants and hence a higher plant output and/or a reduction in the burden on the catalytic reformer and/or higher reduction of metal oxides.

At least one precursor gas is based on the reformer gas, meaning that it may also include other constituents as well as the reformer gas. As well as reformer gas, this precursor gas, in one variant of the method of the invention, may also include smelting plant gases—for example coking furnace gas, COREX/FINEX export gas—and/or other CO carbon monoxide- and/or $H_2$-hydrogen- and/or hydrocarbon-containing, generally CmHn-containing, gases—for example aliphatic hydrocarbons such as methane, based on liquefied petroleum gas (LPG) and/or aromatic hydrocarbons such as benzene, toluene, polycyclic hydrocarbons. In that case, in addition to the reformer gas, these likewise play a role in the provision of the reduction gas and can contribute to the increase in its reduction potential. For example, they can be reformed in situ and hence utilized for the reduction in the reduction unit—i.e., for example, a reduction shaft or a fluidized bed unit.

In one variant, additional gas is added to a precursor gas which is heated up by means of electrical energy—for example the precursor gas based on the reformer gas—hydrocarbonaceous, generally CmHn-containing—for example aliphatic hydrocarbons such as methane, gas based on liquefied petroleum gas (LPG) and/or aromatic hydrocarbons such as benzene, toluene, polycyclic hydrocarbons—before and/or during and/or after heating by means of electrical energy. In that case, this additional gas likewise plays a role in the provision of the reduction gas and can contribute to the increase in its reduction potential. Moreover, the carbon content in the direct reduction product—for example DRI direct reduced iron in the case of iron oxides—can be adjusted by increasing the hydrocarbon content in the reduction gas.

The reduction gas is introduced into a reduction unit containing the metal oxides to be reduced—i.e. for example, in the case of a reduction shaft, into a material bed containing the metal oxides in the reduction shaft, and, in the case of a fluidized bed unit, into a fluidized bed containing the metal oxides in the fluidized bed unit.

In a preferred variant, at least a portion of the hydrocarbonaceous additional gas is reformed in situ before the reduction gas is introduced into a reduction unit containing the metal oxides. This gives rise to additional reducing gas components. The in situ reforming is thus effected, for example, before introduction into a material bed containing the metal oxides in a reduction shaft, or before introduction into a fluidized bed containing the metal oxides in a fluidized bed unit.

A benign mode of operation of a catalytic reformer at a reduced temperature level and/or operation of the reformer with degraded/deactivated catalyst can lead to a composition of the reformer gas that does not promote optimal direct reduction; specifically with regard to $CH_4$ split and $CO_2$ content in the reformer gas. Particularly in that case, it is advantageous when, by decoupling, promoted for example by addition of additional gas that has optionally been reformed in situ, of the composition of the reduction gas from the composition of the reformer gas, it is possible to establish the most favorable composition of the reduction gas for the metal oxides present in the particular case. The control range is greater and the control is quicker compared to an influence via the mode of operation of the reforming, or compared to an influence via alteration of the gas to be reformed. The operation of the reforming and the operation of the direct reduction can thus be optimized independently of one another, which makes the process more economic overall.

Endothermic in situ reaction of hydrocarbonaceous gas with $H_2O$ and $CO_2$ can of course also proceed in the reduction unit—i.e., for example, a reduction shaft or a fluidized bed unit. It can take place prior to entry into the reduction unit when $H_2O/CO_2$ is present in the gas; it can take place in the reduction unit when $H_2O/CO_2$ form as reaction products in the reduction. The reaction proceeds to enhanced degree in the presence of a metallized iron bed.

In a preferred variant, at least a portion of a hydrocarbonaceous precursor gas is reformed in situ before the reduction gas is introduced into a reduction unit containing the metal oxides. This gives rise to additional reducing gas components. The in situ reforming is thus effected, for example, before the reduction gas is introduced into a material bed containing the metal oxides in a reduction shaft, or before the reduction gas is introduced into a fluidized bed containing the metal oxides in a fluidized bed unit.

In the preparation of the reduction gas, a precursor gas based on the reformer gas is heated up by means of electrical energy.

In the preparation of the reduction gas, it is possible to heat up two or more precursor gases based on the reformer gas by means of electrical energy.

In the preparation of the reduction gas, it is also possible to heat up a precursor gas based on the reformer gas by means of electrical energy, and to heat up one or more further precursor gases based on the reformer gas not by means of electrical energy.

In the preparation of the reduction gas, it is also possible to heat up one or more precursor gases based on the reformer gas, and additionally also one or more further precursor gases not based on the reformer gas, by means of electrical energy.

In one variant of the method of the invention, the volume flow rate of at least one of the precursor gases is controlled.

In one variant of the method of the invention, direct reduction of metal oxides is accomplished using at least one additional reduction gas. Additional reduction gas is a gas which is introduced into a reduction unit containing the metal oxides to be reduced in addition to the reduction gas—for example a reduction shaft or a fluidized bed unit, in order to at least partly reduce the metal oxides therein.

Additional reduction gas may, for example, be a precursor gas, for example a precursor gas that has not been heated up by means of electrical energy.

Additional reduction gas is introduced into the reduction unit at a different point than the reduction gas.

The material to be reduced, metal oxides, passes through the reduction unit from an input opening to a withdrawal opening.

In one embodiment, additional reduction gas is introduced upstream of the reduction gas in material flow direction from input opening to withdrawal opening. This can achieve utilization of the additional reduction gas for reduction of the metal oxides before the reduction gas meets the material—viewed in material flow direction.

In another embodiment, the additional reduction gas is introduced downstream of the reduction gas in material flow direction from input opening to withdrawal opening.

On account of the increase in temperature by means of electrical heating, the reduction gas is of good suitability for introduction at high temperature. This is favorable particularly when the direct reduction but also carburization of the material takes place in the reduction unit.

Carburization—introduction of carbon in elemental form, bound in the form of cementite ($Fe_3C$) or in the form of dissolved carbon—can possibly lead to a lowering of temperature on account of endothermic reaction—for example in the case of carburization with $CH_4$ methane—which ultimately means lower-temperature product on withdrawal from the reduction unit. For further processing of the product, however, a maximum temperature of the product is often desired for the purpose of improvement of processibility by hot compaction and of energy balance. Electrical heating allows compensation for the lowering of the temperature by carburization in that reduction gas is introduced at appropriately higher temperature—the end product can then be withdrawn at the desired temperature in spite of carburization. In the case of methods of heating the reduction gas that are based on oxidation with oxygen and hence with an associated decrease in the reduction power of the reduction gas, correspondingly high heating would mean an economically unacceptably high loss of reduction power—and hence higher consumption of reduction gas.

The present application further provides an apparatus for direct reduction of metal oxides by means of a reduction gas, comprising
  a catalytic reformer for production of a reformer gas,
  a reformer gas conduit for discharge of reformer gas from the catalytic reformer,
  a reduction unit,
  a reduction gas conduit for introduction of reduction gas into the reduction unit,
  characterized in that
  the apparatus comprises at least one precursor gas conduit, and at least one precursor gas conduit comprises an electrical gas heating apparatus,
  and at least one precursor gas conduit proceeds from the reformer gas conduit,
  wherein at least one precursor gas conduit that proceeds from the reformer gas conduit comprises an electrical gas heating apparatus,
  and wherein each precursor gas conduit opens into the reduction gas conduit.

There may be one precursor gas conduit or multiple precursor gas conduits. Precursor gas conduits serve to supply precursor gas into the reduction gas conduit.

The precursor gas conduits open into the reduction gas conduit. At least one precursor gas conduit proceeds from the reformer gas conduit.

At least one of the precursor gas conduits proceeding from the reformer gas conduit comprises an electrical gas heating apparatus, where "an" in "an electrical gas heating apparatus" does not mean one but is the indefinite article. Precursor gas conduits may each comprise a single electrical gas heating apparatus or multiple electrical gas heating apparatuses.

It is also optionally additionally possible for one or more further precursor gas conduits that do not proceed from the reformer gas conduit to comprise an electrical gas heating apparatus, where "an" in "an electrical gas heating apparatus" does not mean one but is the indefinite article. Precursor gas conduits may each comprise a single electrical gas heating apparatus or multiple electrical gas heating apparatuses.

The reduction unit is, for example, a reduction shaft or a fluidized bed unit. In a reduction shaft, there is a solid material bed comprising the metal oxides; in a fluidized bed unit, there is a fluidized bed containing the metal oxides.

In the catalytic reformer, reformer gas is obtained by catalytic reforming of hydrocarbonaceous gas. This is discharged from the catalytic reformer via the reformer gas conduit and introduced into at least one precursor gas conduit.

In electrical gas heating apparatuses, precursor gas is heated up by means of electrical energy.

The reduction gas is based on precursor gas. Each precursor gas conduit opens into the reduction gas conduit via which the reduction gas is introduced into the reduction unit—the reduction gas is thus based on all precursor gases that are introduced into the reduction gas conduit via the corresponding precursor gas conduits. In the reduction unit, the metal oxides are directly reduced by means of the reduction gas.

There may, for example, be a single precursor gas conduit; this proceeds from the reformer gas conduit, opens into the reduction gas conduit, and comprises at least one electrical gas heating apparatus.

It is also possible for there to be a precursor gas conduit that proceeds from the reformer gas conduit, comprises an electrical gas heating apparatus, and opens into the reduction gas conduit, and a second precursor gas conduit that optionally also comprises an electrical gas heating apparatus and opens into the reduction gas conduit. The second precursor gas conduit in this case may proceed, for example, from the reformer gas conduit, or from a reformer feed conduit through which gas to be reformed is supplied to the reformer.

In one variant, at least one additional gas conduit opens into at least one precursor gas conduit—when the precursor gas conduit comprises an electrical gas heating apparatus, for example before or after the electrical gas heating apparatus, or into the electrical gas heating apparatus. Additional gas conduits serve to supply additional gas to precursor gas.

In one variant, the precursor gas conduit comprising an electrical gas heating apparatus, viewed in flow direction of the precursor gas, comprises a non-electrical heating apparatus upstream of the electrical gas heating apparatus.

In one variant, the apparatus for direct reduction comprises at least one additional reduction gas conduit for introduction of additional reduction gas into the reduction unit.

In one variant, at least one additional reduction gas conduit proceeds from a precursor gas conduit.

The apparatus for direct reduction of metal oxides by means of a reduction gas preferably comprises at least one apparatus for control of the volume flow rate of at least one precursor gas.

The present application further provides a signal processing unit having a machine-readable program code, characterized in that it includes control commands for performance of a method of the invention.

The present application further provides a machine-readable program code for a signal processing unit, characterized in that the program code includes control commands that cause the signal processing unit to perform a method of the invention.

The present application further provides a storage medium with a machine-readable program code of the invention installed thereon.

The electrical gas heating apparatus can heat, for example, by means of resistance heating by heating coils, or by means of an arc between electrodes.

The electrical gas heating apparatus preferably comprises at least two plasma burners; most preferably, it comprises at least three plasma burners. At least two plasma burners are operable independently of one another. Plasma burners generally have relatively short service lives in sustained operation—the high temperatures of the arc and the arc itself cause particularly severe stress on the anode and cathode of the plasma burner—so that they often have to be serviced or exchanged. It would accordingly be expected that economic operation is not possible in the case of a process regime with one plasma burner, since exchange or servicing of the plasma burner would interrupt the direct reduction method. If there are multiple plasma burners, servicing or exchange of a plasma burner can be effected while other plasma burners are being operated, such that the direct reduction method need not be interrupted, or changes in operation, for example reduction in power of the direct reduction method, are not required.

The electrical gas heating apparatus may comprise one heating chamber with multiple plasma burners, or multiple heating chambers each with one or more plasma burners.

The electrical gas heating apparatus preferably comprises at least one heating chamber having one plasma burner, having at least one exit opening for exit of heated gas, and having at least one entry opening for entry of precursor gas, and having at least one longitudinal heating chamber wall extending longitudinally when viewed from the entry opening toward the exit opening, wherein the plasma burner is disposed in the middle of the heating chamber, and wherein the entry opening is disposed between plasma burner and longitudinal heating chamber wall. This arrangement reduces the high heat transfer—for example thermal radiation and/or convection of the plasma gas—to the longitudinal heating chamber wall because the precursor gas has a lower temperature than the gas exiting from the plasma burner. Excessively high heat transfer to the longitudinal heating chamber wall can lead to high wear or damage to the walls and hence the heating chamber. A preferred variant is to provide multiple entry openings, with, for example, entry openings being disposed between all the longitudinal heating chamber walls and the plasma burner.

In principle, entry openings for cooling media may also be provided—for example optionally reinforced stubs and pipelines between plasma burner and longitudinal heating chamber walls, in order to prevent direct contact of plasma with the walls. Such cooling media will ultimately go into the reduction gas together with heated precursor gas.

The electrical gas heating apparatus preferably comprises at least one heating chamber having a plasma burner, having at least one exit opening for exit of heated gas, and having at least one entry opening for entry of precursor gas, and having at least one longitudinal heating chamber wall extending longitudinally when viewed from the entry opening toward the exit opening, wherein the entry opening is disposed and the heating chamber shaped such that an introduced stream of the precursor gas flows from the entry opening to the exit opening in spiral form around the plasma burner between plasma burner and longitudinal heating chamber wall. The shape of the inlet may be curved, for example, for example as part of an ellipse or based on a spline. This arrangement too reduces the high heat transfer—for example thermal radiation and/or convection of the plasma gas—to the wall of the heating chamber because the precursor gas has a lower temperature than the gas exiting from the plasma burner. Excessively high heat transfer to the wall of the heating chamber can lead to high wear or damage to the walls and hence to the heating chamber. The spiral vortex of the stream introduced is cooler than the plasma or the gas heated by the plasma. The heating of the gas is inhomogeneous since it is primarily the gas molecules in the vicinity of the plasma that are heated, whereas the gas molecules further away from the plasma—i.e., for example, close to the longitudinal heating chamber wall—are heated to a lesser degree. With increasing movement toward the exit opening, hotter and colder gas molecules are mixed, and a homogeneous gas temperature is established. The temperature at the longitudinal heating chamber wall preferably does not rise above the homogeneous gas temperature as mixing progresses.

The arrangement of the entry opening may, for example, be such that the entry opening is in a nonsymmetric—i.e. unsymmetric—arrangement relative to the longitudinal axis of the heating chamber. Considering the cross section of the entry opening in the heating chamber direction at right angles to the longitudinal axis of the heating chamber, the cross section is thus not divided symmetrically into two equal halves by the longitudinal axis, or not divided at all. Such an arrangement of the entry opening can also be referred to as eccentric, specifically in the case of a form of the heating chamber which is symmetric with respect to the longitudinal axis. In the case of such an eccentric arrangement, the stream of the precursor gas introduced can flow along the longitudinal heating chamber wall in spiral form; the stream is not introduced aimed at the longitudinal axis, but, for example, at least partly tangentially to the longitudinal heating chamber wall.

It is preferable here that the hydraulic diameter of the entry opening is in the range from 25% to 75% of the hydraulic heating chamber diameter at the level of the entry opening. When the heating chamber comprises a cylindrical entry section with entry opening and a conical exit section with exit opening, it is preferable that the hydraulic diameter of the entry opening is in the range from 25% to 75% of the diameter of the entry opening.

When the heating chamber comprises a cylindrical entry section with entry opening and a conical exit section with exit opening, it is preferable that the ratio of height of the entry section to the diameter of the entry section is in the range from 1 to 10, preferably 1 to 5, more preferably 1 to 2.5.

When the heating chamber comprises a cylindrical entry section with entry opening and a conical exit section with exit opening, it is preferable that the angle of the lateral heating chamber wall of the exit section relative to the longitudinal axis is in the range of 5°-45°.

The gas heating apparatus preferably comprises at least one heating chamber in which there are multiple plasma burners. The energy for heating can thus be introduced at multiple points. This has the effect that the local heat stress on the heating chamber is reduced; instead of introducing all the energy at one point, less energy is introduced at each of multiple points. This distributes the local thermal stress over a greater area. There is a multitude of options for the arrangement of the plasma burners. In particular, possible arrangement forms are an annular, semicircular or part-circular arrangement radially around the longitudinal axis of the heating chamber. The arrangement may also be multiple rings of plasma burners successively in the direction of the longitudinal axis of the heating chamber, or else merely individual plasma burners successively in the direction of the longitudinal axis of the heating chamber. The longitudinal axis of the heating chamber is in the direction of the longitudinal extent from a gas inlet opening into the heating chamber toward a gas outlet opening of the heating chamber; in operation, the precursor gas flows from the gas inlet opening to the gas outlet opening.

The direction vector of the incoming plasma burner flow may either be axial or at least partly axial and/or tangential or at least partly tangential to the flow of the precursor gas from the gas inlet opening to the gas outlet opening. It may be directed here such that the thermal stress on the heating chamber is minimized and/or gas mixing is maximized. It is possible in this case, for example, to specifically achieve tangential flow, vortex flows or else other advantageous flow patterns.

Heating chambers are typically lined with refractory material. Preferably at least one heating chamber has cooling conduits. Thus, cooling is possible by means of cooling water, steam or other media at least partly in front of or behind lining material or instead of lining material.

BRIEF DESCRIPTION OF THE DRAWINGS

The invention is elucidated by schematic, illustrative drawings of embodiments.

FIG. 1 shows a schematic of an embodiment of a method of the invention and of an apparatus of the invention for direct reduction of metal oxides by means of a reduction gas.

FIGS. 2a and 2b show schematics of longitudinal sections and cross sections through one embodiment of part of an electrical gas heating apparatus.

FIG. 3 shows a schematic of a section through an embodiment of part of an electrical gas heating apparatus.

DESCRIPTION OF THE EMBODIMENTS

Examples

Figure 4A:
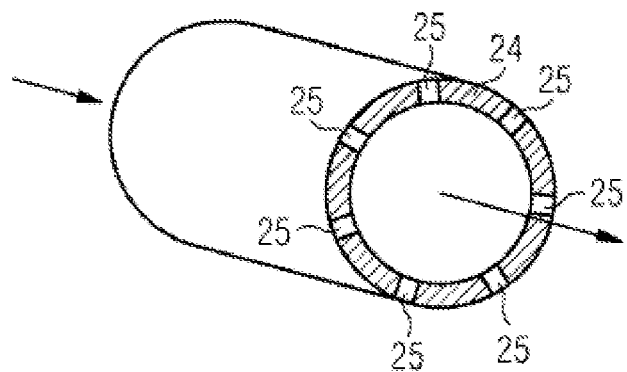
FIGS. 4a to 4i show schematics of variants of the arrangement of plasma burners in a heating chamber of a gas heating apparatus.
Figure 4B:
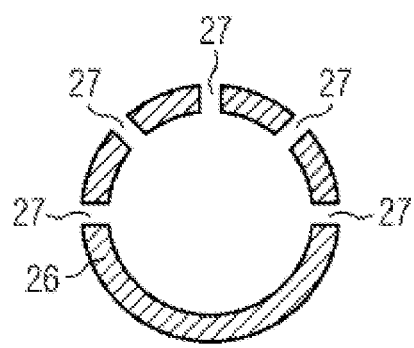
Figure 4C:
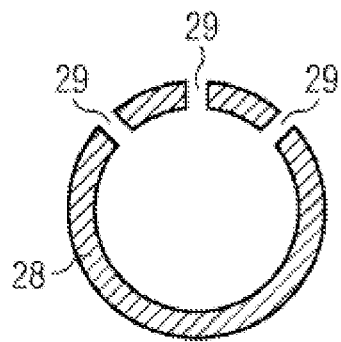
Figure 4D:
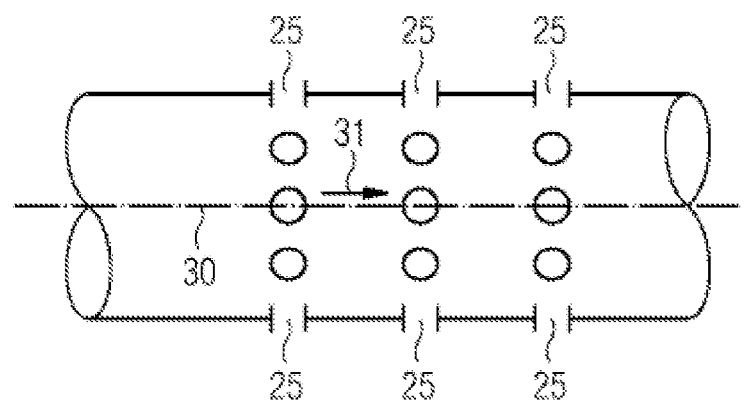
Figure 4E:
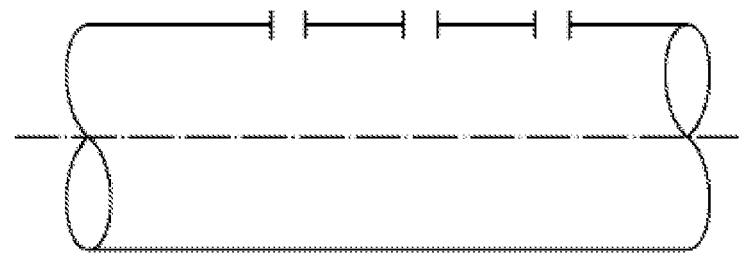

FIG. 1 shows a schematic of an embodiment of an inventive apparatus for direct reduction 1 of metal oxides 2 by means of a reduction gas.

In a catalytic reformer 3, reformer gas is produced by catalytic reforming of hydrocarbonaceous gas 4.

The reformer gas is discharged from the catalytic reformer 3 via the reformer gas conduit 5.

A precursor gas conduit 6 proceeds from the reformer gas conduit 5. The precursor gas conduit 6 comprises an electrical gas heating apparatus 7.

The precursor gas is based on the reformer gas and is heated up by means of electrical energy in the electrical gas heating apparatus 7. The precursor gas conduit 6—beyond the electrical gas heating apparatus 7 when viewed in flow direction away from the reformer—opens into a reduction gas conduit 8. The latter itself opens into a reduction unit 9; it introduces reduction gas into the reduction unit 9.

The metal oxides are within the reduction unit 9; in the case shown, the reduction unit 9 is a reduction shaft in which there is a solid material bed comprising the metal oxides. In the reduction unit 9, the metal oxides 2 are directly reduced by means of the reduction gas flowing through the material bed.

The reformer gas conduit 5 may optionally also additionally have an opening into the reduction gas conduit 8; this is represented by a branch from reformer gas conduit 5 which is shown by a dashed line. In this way, it is possible for some reformer gas to bypass the gas heating apparatus 7 and be added as additional gas to the heated precursor gas.

It would be possible in principle, in FIG. 1, for the purpose of preparation of the reduction gas, for there also to be further precursor gas conduits for supply of further precursor gases; this is not shown additionally for better clarity.

FIGS. 2a and 2b show longitudinal sections and cross sections through one embodiment of part of an electrical gas heating apparatus 10 having a heating chamber 11 with a plasma burner 12. The plasma burner 12 is arranged in the middle of the heating chamber 11. This can clearly be seen in cross section in FIG. 2b along the line A-A from FIG. 2a. The heating chamber 11, which is a round cylinder in the example shown, is bounded by the longitudinal heating chamber wall 13. Precursor gas—shown as an arrow—is introduced into the heating chamber 11 through the entry openings 14a, 14b, 14c, 14d. Heated gas—represented by a block arrow—is discharged from the heating chamber 11 through an exit opening which is not shown additionally—represented by an arrow. The precursor gas is introduced into the heating chamber 11 between the longitudinal heating chamber wall 13 and the plasma burner 12. The stream of the precursor gas 15 from the entry opening 14a shown is thus between the plasma 16 and longitudinal heating chamber wall 13. It would also be possible for multiple heating chambers of this kind with one plasma burner each to be present in the electrical gas heating apparatus.

FIG. 3 shows a section through an embodiment of part of an electrical gas heating apparatus 17 having a heating chamber 18 with the plasma burner 19. The heating chamber 18 is essentially in cylindrical form, with the plasma burner 19 essentially along the cylinder axis 20. An entry apparatus 21 with entry opening introduces precursor gas 22 tangentially into the heating chamber 18, and after entry it flows around the plasma burner 19 to the exit opening 23. The cylinder axis 20 runs through the exit opening 23 for discharge of the heated gas. It would also be possible to provide multiple heating chambers of this kind with one plasma burner each in the electrical gas heating apparatus.

FIGS. 4 a-i show variants of the arrangement of plasma burners in a heating chamber of a gas heating apparatus in which there are multiple plasma burners. In particular, possible forms of arrangement are annular, semicircular or part-circular, radially around the longitudinal axis of the heating chamber, which is shown in FIGS. 4a, 4b, 4c. FIG. 4a shows, in oblique view in a section through a cylindrical heating chamber 24 at right angles to the longitudinal axis—corresponding to the flow direction of the gas to be heated, indicated by arrows—how multiple openings 25 are present in a ring for mounting of plasma burners. The plasma burners may stand with their longitudinal axis, for example, at right angles or oblique relative to the longitudinal axis of the heating chamber 24. FIG. 4b shows, in a section through a cylindrical heating chamber 26 at right angles to the longitudinal axis—corresponding to the flow direction of the gas to be heated—how multiple openings 27 are present in a semicircle for mounting of plasma burners. FIG. 4c shows, in a section through a cylindrical heating chamber 28 at right angles to the longitudinal axis—corresponding to the flow direction of the gas to be heated—how multiple openings 29 are present in a semicircle for mounting of plasma burners. FIG. 4d shows, in a longitudinal section through a section of a heating chamber as in FIG. 4a, how multiple rings of plasma burners can be installed; what are shown are the openings 25 for assembly, the longitudinal axis 30 of the heating chamber and the gas flow direction 31. FIG. 4e shows this in a corresponding view for an arrangement in which there is in each case only one plasma burner per position along the longitudinal axis.

Figure 4F:
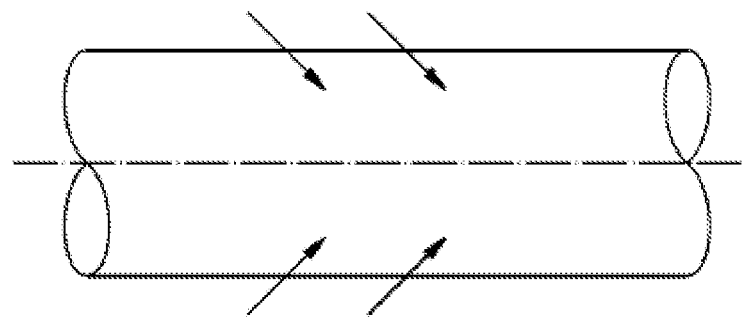
Figure 4G:
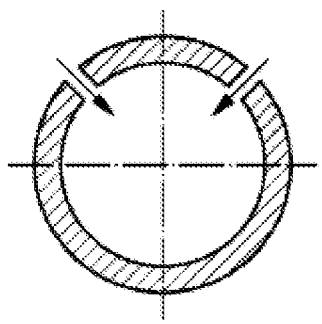
Figure 4H:
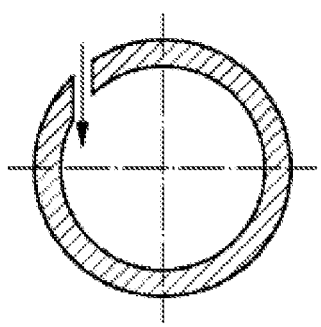

FIG. 4f shows, in a corresponding view, an example of how the plasma burners can be oriented with respect to the longitudinal axis. The arrows indicate that the plasma burners are inclined toward the longitudinal axis. FIGS. 4g and 4h show, in a view largely analogous to FIG. 4a, that the plasma burners indicated by arrows may be directed to the center of the gas flow—shown in FIG. 4g—or virtually tangentially to the gas flow—shown in FIG. 4h. The direction vector of the incoming plasma burner flow—corresponding to the arrow directions in FIGS. 4g and 4h—may thus be at least partially axial and/or at least partially tangential to the flow of the gas from the gas inlet opening to the gas outlet opening.

Figure 4I:
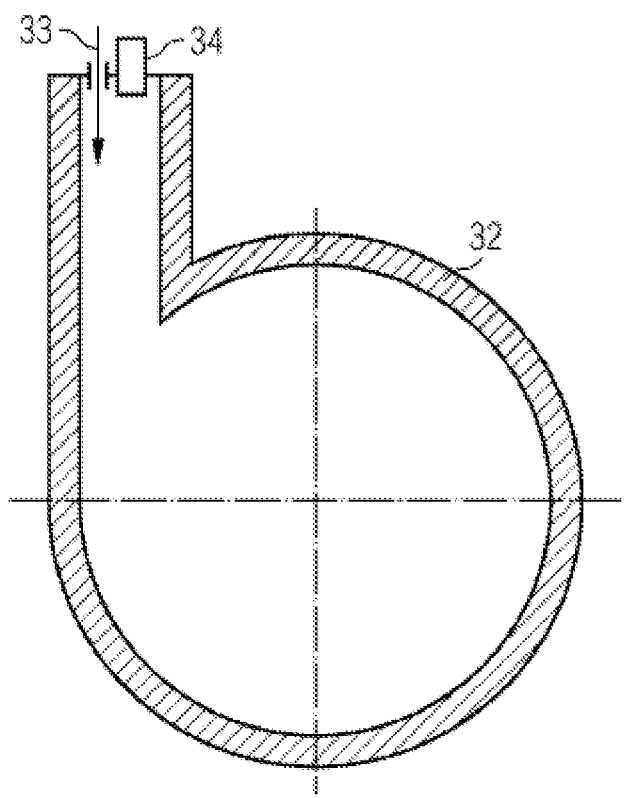

FIG. 4i shows, in schematic form, by a section at right angles to the longitudinal axis of a variant of a heating chamber 32, how the gas stream 33 to be heated is introduced between plasma burner 34 and wall of the heating chamber 32.

Figure 5A:
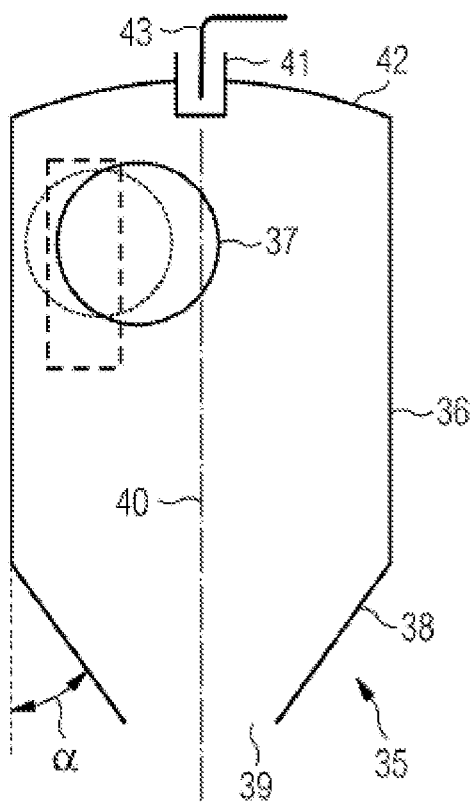
FIGS. 5a and 5b show schematics of longitudinal sections and cross sections through a heating chamber in one embodiment.

FIG. 5a shows a longitudinal section through a heating chamber 35 comprising a cylindrical entry section 36 with entry opening 37 and a conical exit section 38 with exit opening 39. The hydraulic diameter of the entry opening 37 is 45% of the diameter of the entry section.

The ratio of diameter of the entry opening 37 to the radius of the entry section 36 is 90%.

The angle α of the lateral heating chamber wall of the exit section to the longitudinal axis 40 is 35°.

The plasma burner 41 is disposed in the middle of the lid section 42; a carrier gas conduit 43 for supply of carrier gas is also shown.

The entry opening is in a nonsymmetric—i.e. unsymmetric—arrangement relative to the longitudinal axis of the heating chamber. In the case of such an eccentric arrangement, the stream of the precursor gas introduced can flow in a spiral along the longitudinal heating chamber wall—in the entry section and in the exit section; the stream is not introduced aimed radially at the longitudinal axis, but is introduced tangentially to the longitudinal heating chamber wall.

For illustration of a selection of other options for the shape of the entry opening or positioning thereof with respect to the longitudinal axis 40, outlines of a round entry opening are shown by a dotted line, and of a rectangular entry opening by a dashed line.

Figure 5B:
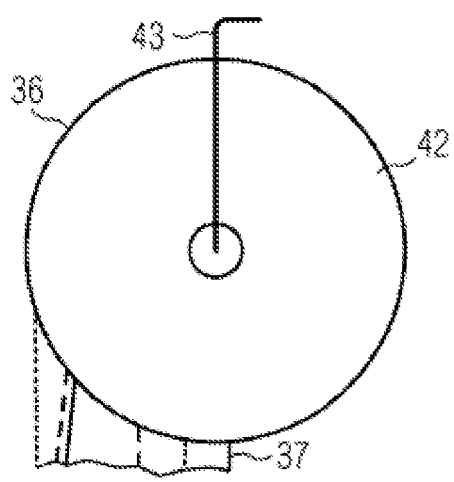

FIG. 5b shows a view of the apparatus shown in FIG. 5a from the top. Analogously to FIG. 5a, outlines of variants of the entry opening are also shown by a dotted and a dashed line.

Figure 6A:
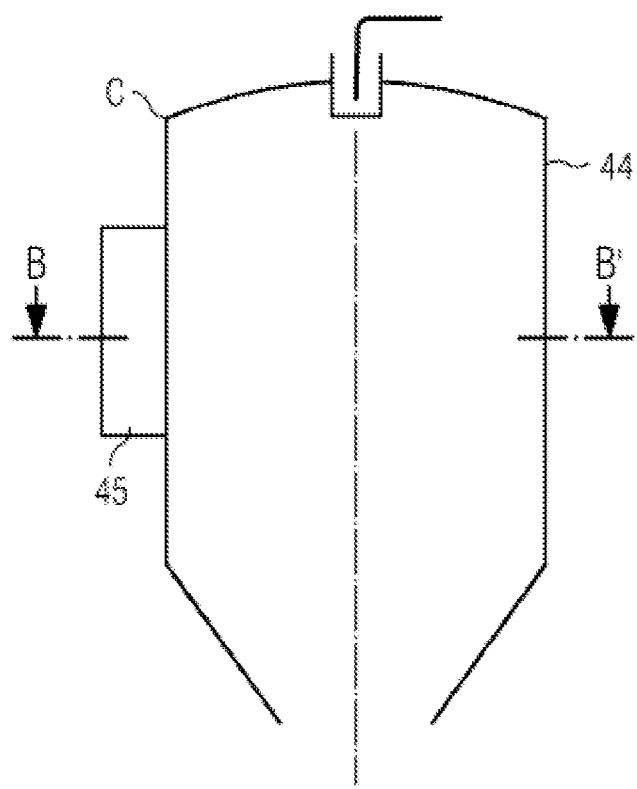
FIGS. 6a and 6b show schematics of longitudinal sections and cross sections through a heating chamber in another embodiment.
Figure 6B:
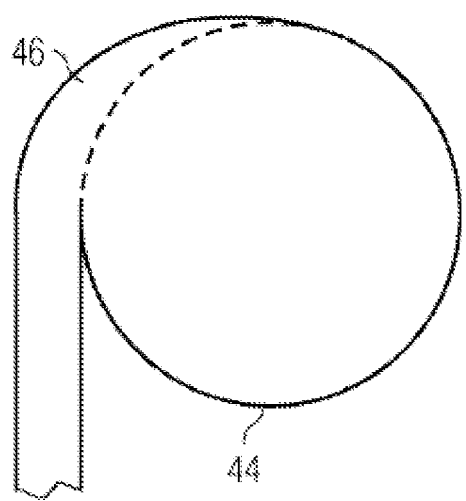

FIGS. 6a and 6b show, in views largely analogous to FIGS. 5a and 5b, an embodiment in which the entry opening 45 is offset to the side by comparison with FIG. 5a in the entry section 44. Introduction of the gas stream to be heated into the cylindrical entry section 44 is in spiral form.

FIG. 6b shows in schematic form, by a section F-F', viewed from above, how the entry is drawn in the form of a spiral around the cylindrical entry section 44. The dashed line shows the outline of the edge C in the region of the opening of the entry opening into the cylindrical entry section.

The spiral portion could also extend less far or further; the shape of the entire entry section could also follow the spiral defined by the inlet 46.

Figure 7:
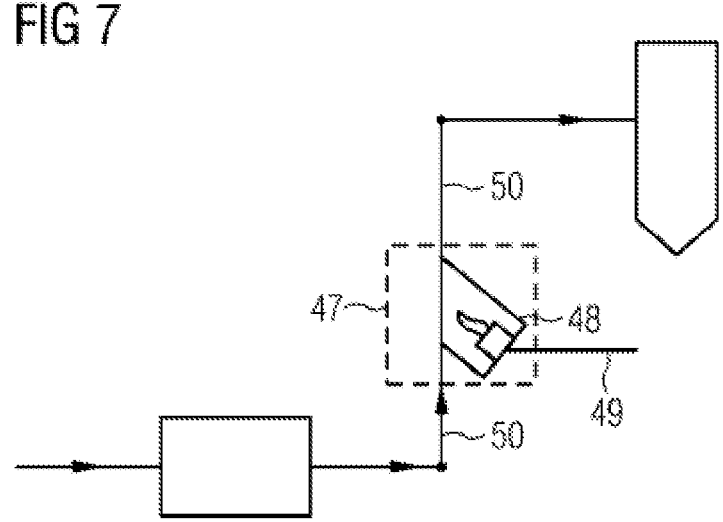
FIGS. 7 and 8 show further embodiments largely analogous to FIG. 1.

FIG. 7 shows, analogously to FIG. 1, how, in the electrical gas heating apparatus 47, a plasma burner 48, the plasma of which is produced with electrical energy utilizing carrier gas from the carrier gas conduit 49, heats the precursor gas reformer gas in the precursor gas conduit 50 in the gas heating apparatus 47. The electrical energy is introduced into the precursor gas by means of plasma.

Figure 8:
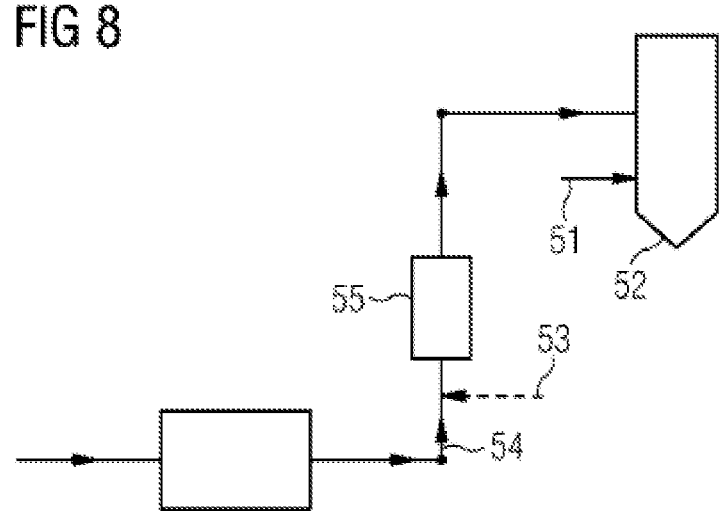

FIG. 8 shows, largely analogously to FIG. 1, an embodiment of an apparatus of the invention in which there is an additional reduction gas conduit 51 for introduction of additional reduction gas into the reduction unit 52. What is also shown by dashed lines is the optional addition of natural gas 53 into the precursor gas conduit 54 upstream of the electrical gas heating apparatus 55. What is heated is a precursor gas which is a mixture of natural gas 53 and reformer gas; this precursor gas is based on reformer gas.

Although the invention has been illustrated and described in detail by the preferred working examples, the invention is not limited by the examples disclosed, and other variations can be derived therefrom by the person skilled in the art without leaving the scope of protection of the invention.

LIST OF REFERENCE NUMERALS

1 Apparatus for direct reduction
2 Metal oxides
3 Reformer
4 Hydrocarbonaceous gas
5 Reformer gas conduit
6,6',6",6'" Precursor gas conduit
7 Gas heating apparatus
8 Reduction gas conduit
9 Reduction unit
10 Gas heating apparatus
11 Heating chamber
12 Plasma burner
13 Longitudinal heating chamber wall
14a,14b,14c,14d Entry openings
15 Precursor gas
16 Plasma
17 Gas heating apparatus
18 Heating chamber
19 Plasma burner
20 Cylinder axis
21 Entry apparatus
22 Precursor gas
23 Exit opening
24 Heating chamber
25 Openings for mounting of plasma burners
26 Heating chamber
27 Openings for mounting of plasma burners
28 Heating chamber
29 Openings for mounting of plasma burners
30 Longitudinal axis
31 Gas flow direction
32 Heating chamber
33 Gas stream to be heated
34 Plasma burner
35 Heating chamber
36 Entry section
37 Entry opening
38 Exit section
39 Exit opening
40 Longitudinal axis
41 Plasma burner
42 Lid section
43 Carrier gas conduit
44 Entry section
45 Entry opening
46 Inlet
47 Gas heating apparatus
48 Plasma burner
49 Carrier gas conduit
50 Precursor gas conduit
51 Additional reduction gas conduit
52 Reduction unit
53 Natural gas
54 Precursor gas conduit
55 Gas heating apparatus

The invention claimed is:

1. A method of direct reduction of metal oxides with a reduction gas, comprising:
catalytic reforming of hydrocarbonaceous gas in a reformer to obtain reformer gas, the reformer gas exiting the reformer at a first temperature,
producing at least one precursor gas based on the reformer gas, and
preparing the reduction gas by heating the at least one precursor gas to a second temperature above the first temperature by means of electrical energy
wherein at least a portion of the electrical energy is introduced by means of plasma.

2. The method as claimed in claim 1, wherein the second temperature is no more than 200° C. above the first temperature.

3. The method as claimed in claim 2, wherein the at least one precursor gas envisaged for electrical heating, prior to the heating by means of the electrical energy, is already heated in another way to at least 700° C.

4. The method as claimed in claim 3, wherein the at least one precursor gas envisaged for the electrical heating is heated by means of the electrical energy to more than 800° C.

5. The method as claimed in claim 1, wherein on introduction of the reduction gas into a reduction unit containing the metal oxides to be reduced, the temperature of the reduction gas is in the range of 800° C. to 1100° C.

6. The method as claimed in claim 1, further comprising directly reducing metal oxides using at least one additional reduction gas.

7. The method as claimed in claim 1, further comprising heating one or more further precursor gases, by means of electrical energy.

8. The method as claimed in claim 7, further comprising adding hydrocarbonaceous additional gas to the further precursor gas which is heated by means of electrical energy.

9. The method as claimed in claim 8, further comprising reforming at least a portion of the hydrocarbonaceous additional gas in situ before the reduction gas is introduced into a reduction unit containing the metal oxides.

10. The method as claimed in claim 7, wherein the one or more further precursor gases comprises the at least one precursor gas or another precursor gas.

* * * * *